(12) United States Patent
Oshita

(10) Patent No.: US 8,328,199 B2
(45) Date of Patent: Dec. 11, 2012

(54) SEAL DEVICE

(75) Inventor: Kotaro Oshita, Tokyo (JP)

(73) Assignee: Eagle Industry Co., Ltd. (JP)

( * ) Notice: Subject to any disclaimer, the term of this patent is extended or adjusted under 35 U.S.C. 154(b) by 145 days.

(21) Appl. No.: 13/122,953

(22) PCT Filed: Jun. 14, 2010

(86) PCT No.: PCT/JP2010/060016
§ 371 (c)(1),
(2), (4) Date: Apr. 6, 2011

(87) PCT Pub. No.: WO2011/036920
PCT Pub. Date: Mar. 31, 2011

(65) Prior Publication Data
US 2011/0198814 A1    Aug. 18, 2011

(30) Foreign Application Priority Data

Sep. 24, 2009   (JP) .................................. 2009-218389

(51) Int. Cl.
*F16J 15/43* (2006.01)
(52) U.S. Cl. ....................................................... 277/410
(58) Field of Classification Search .................... 277/410
See application file for complete search history.

(56) References Cited

U.S. PATENT DOCUMENTS

| | | | | |
|---|---|---|---|---|
| 4,380,356 A | * | 4/1983 | Weghaupt | 384/133 |
| 6,543,781 B1 | * | 4/2003 | Rehm et al. | 277/410 |
| 6,736,402 B1 | * | 5/2004 | Li | 277/410 |
| 7,950,672 B2 | * | 5/2011 | Shimazaki et al. | 277/410 |
| 8,047,549 B2 | * | 11/2011 | Kung | 277/410 |
| 2004/0262846 A1 | * | 12/2004 | Anzai et al. | 277/410 |
| 2009/0115137 A1 | * | 5/2009 | Shimazaki et al. | 277/410 |
| 2010/0171271 A1 | * | 7/2010 | Kung | 277/410 |

FOREIGN PATENT DOCUMENTS

| | | |
|---|---|---|
| JP | 59129699 | 8/1984 |
| JP | 6097462 | 7/1985 |
| JP | 6292362 | 6/1987 |
| JP | 7317916 | 12/1995 |
| JP | 8068379 | 3/1996 |
| JP | 2003240131 | 8/2003 |
| JP | 2003294156 | 10/2003 |

OTHER PUBLICATIONS

International Preliminary Report on Patentability for corresponding international application No. PCT/JP2010/060016, dated Apr. 11, 2012 (7 pgs).
PCT International Search Report for PCT/JP2010/060016 (3 pgs).

* cited by examiner

*Primary Examiner* — Vishal Patel
*Assistant Examiner* — L. Susmitha Koneru
(74) *Attorney, Agent, or Firm* — Hayes Soloway P.C.

(57) ABSTRACT

A seal device has a magnetic force generator for generating a magnetic force in a vicinity of a shaft. A first magnetism transmission member for transmitting the magnetic force generator is disposed adjacent to one side of the magnetic force generator. A second magnetism transmission member for transmitting the magnetic force generated by the magnetic force generator is disposed adjacent to another side of the magnetic force generator. A slide bush is disposed and secured between an inner flange of the second magnetism transmission member and the shaft. A seal member for sliding relative to an outer peripheral surface of the shaft, is accommodated in a sealing. And, a magnetic fluid is held between the shaft and the magnetism transmission member by the magnetic force generated by the magnetic force generator.

2 Claims, 6 Drawing Sheets

SEAL DEVICE

TECHNICAL FIELD

The present invention relates to a seal device suitable for application to, inter alia, a rotating shaft for transmitting motion from an exterior into a chamber, a clean room, or another closed space.

Background Art

Oxidation, diffusion, CVD (chemical vapor deposition), and similar treatments performed on a semiconductor wafer during, e.g., a process of manufacturing a semiconductor device are performed while the wafer is kept in a vacuum or in a specific gas atmosphere. In many instances, the wafer is accommodated in a chamber or a container maintained in a predetermined environment (referred to as a "treatment chamber" hereafter), exposed to an atmosphere in the treatment chamber while, e.g., being rotated or moved in a similar manner, and subjected to treatment. Therefore, the treatment chamber used for a treatment of above description must be highly airtight and must allow mechanical motion to be transmitted from an exterior of the treatment chamber into an interior of the treatment chamber to, e.g., cause the wafer to rotate.

Known conventional techniques for transmitting mechanical motion into the interior of a treatment chamber that in a sealed state include, for example, a seal device using an elastomer seal (such as an O-ring) coated with a vacuum grease. However, according to a conventional technique of such description, it is necessary that the vacuum grease used has a high viscosity so that the grease is held on a sliding part of a shaft and the seal. Therefore, a problem is presented in that even when the grease degrades, it is not replaced by surrounding grease, and the sliding lifespan of the seal is reduced.

Known conventional techniques for solving such a problem include, for example, a seal device using an elastomer seal and a magnetic fluid held magnetically between a pole piece and a shaft (refer to patent reference 1). However, according to a conventional technique of such description, a problem is presented in that even when a magnetic fluid is held at a distal end of the pole piece, a majority of the magnetic fluid does not reach the elastomer seal. Therefore, the magnetic fluid used in the seal device according to the conventional technique does not function as a lubricant to a sufficient degree, and the seal device according to the conventional technique still poses a problem with regards to sliding lifespan.

Other known conventional techniques relating to a seal device include a seal device having a shaft provided with an annular protrusion and a yoke provided in contact with a permanent magnet, wherein a magnetic fluid is held between an inner peripheral surface of the yoke and the annular protrusion (i.e., a rotating shaft protrusion-type magnetic fluid seal rotating shaft bearing; refer to patent reference 2). However, the seal device in which magnetic fluid is held between the inner peripheral surface of the yoke and the annular protrusion has a complex structure, requires extremely precise processing and assembly steps, and still poses problems in terms of manufacturability and cost.

In order to solve such problems, the inventor has proposed a seal device, as shown in FIG. 6 (PCT/JP2009/062198). The seal device according to the prior invention is a device for sealing a rotating shaft 51 for transmitting a predetermined mechanical motion from an exterior of a treatment chamber 50 into an interior of the treatment chamber 50, wherein an elastomer seal is used as a seal member 53; a magnetic fluid 54 is used as a lubricant; and a bearing 55 made of a metallic ball bearing, roller bearing, or a similar bearing is internally provided in order to minimize runout of a seal part, stabilize the sealing performance of the seal part, and receive a load from the exterior. A device bearing 52 is provided towards the treatment chamber 50, separately to the bearing 55 in the seal part. When the bearing 55 is internally provided in the seal part, problems are presented in that the total length of the seal device is increased, and the seal design is restricted by the dimensions of the bearing. Also, in an instance of a seal device provided with a bearing, a problem is also presented in that the seal device must be shipped together with a shaft.

Prior Art References

Patent References

Patent reference 1: JP-A H07-317916
Patent reference 2: JP-A 2003-294156

DISCLOSURE OF THE INVENTION

Problems to be Solved by the Invention

In order to solve the above-mentioned problems, a first object of the present invention is to provide a seal device that has a simple structure, has a satisfactory sliding lifespan, and is suitable for applying to a device such as a rotating shaft for transmitting motion into a treatment chamber from an exterior.

A second object of the present invention is to provide a seal device having a small length in an axial direction.

A third object of the present invention is to provide a cartridge-type seal device.

Means for Solving the Above-Mentioned Problem

In order to achieve the above objects, a seal device according to a first aspect of the present invention is a device for sealing a shaft for transmitting a predetermined mechanical motion to an interior of a treatment chamber maintained in a predetermined environment from an exterior of the treatment chamber while maintaining the environment in the treatment chamber, the seal device characterized in comprising:

a housing through which the shaft penetrates;

magnetic force generating means for generating a magnetic force in a vicinity of the shaft, the magnetic force generating means being disposed between the housing and the shaft, a first magnetism transmission member for transmitting the magnetic force generated by the magnetic force generating means, the first magnetism transmission member being disposed adjacent to one side of the magnetic force generating means and having a pair of inner flanges projecting from said housing towards said shaft, the inner flanges forming a sealing groove surrounding said shaft;

a second magnetism transmission member for transmitting the magnetic force generated by the magnetic force generating means, the second magnetism transmission member having an inner flange protruding from the housing towards the shaft, and being disposed adjacent to another side of the magnetic force generating means, a slide bush, disposed between the inner flange of the second magnetism transmission member and the shaft, the slide bush being secured to the inner flange so that a very small gap is present relative to an outside surface of the shaft;

a seal member for sliding relative to an outer peripheral surface of the shaft, the seal member being accommodated in the sealing groove so as to at least partially protrude towards the shaft; and a magnetic fluid, held between the shaft and the magnetism transmission member by the magnetic force generated by the magnetic force generating means; wherein the sealing groove has a substantially rectangular cross-section passing through a center axis of the shaft;

the seal member has four protruding parts projecting towards respective vertices of the substantially rectangular shape of the sealing groove; and two of the protruding parts that project towards the shaft have formed therebetween a fluid-holding groove for holding the magnetic fluid.

According to the first aspect, the seal member having protruding parts projecting towards each of the vertices of the rectangular shape is accommodated in the sealing groove having a substantially rectangular cross-section. As a result, two of the protruding parts of the seal member that project towards the shaft and form a sliding surface for sliding against the shaft are provided in a state of being in proximity with a distal end part of a magnetism transmission member where a large amount of the magnetic fluid is secured. Therefore, the distance between the magnetic fluid held by the magnetism transmission member and the sliding surface of the seal member is reduced, and the magnetic fluid can readily reach the sliding surface of the seal member. Specifically, in the seal device according to the present invention, the magnetic fluid is capable of functioning, to a sufficient degree, as a lubricant in a vicinity of the interface where the seal member and the shaft slide, and increasing the sliding lifespan of the seal member.

Also, providing a slide bush obviates the need for a bearing in the seal device, allows a reduction in the length of the seal device in an axial direction, and enables the seal device to be freely designed without a radial direction dimension being affected by bearing dimensions.

Also, having a member for securing the slide bush be the same as the magnetism transmission member forming a magnetic circuit makes it possible to utilize space in an effective manner and contribute towards reducing the length in the axial direction.

A seal device according to a second aspect of the present invention is a device for sealing a shaft for transmitting a predetermined mechanical motion to an interior of a treatment chamber maintained in a predetermined environment from an exterior of the treatment chamber while maintaining the environment in the treatment chamber, the seal device characterized in comprising:

a housing through which the shaft penetrates;

magnetic force generating means for generating a magnetic force in a vicinity of the shaft, the magnetic force generating means being disposed between the housing and the shaft;

a first magnetism transmission member for transmitting the magnetic force generated by the magnetic force generating means, the first magnetism transmission member being disposed adjacent to one side of the magnetic force generating means and having a pair of inner flanges projecting from said housing towards said shaft, the inner flanges forming a sealing groove surrounding said shaft;

a second magnetism transmission member for transmitting the magnetic force generated in the magnetic force generating means, the second magnetism transmission member having an inner flange protruding from the housing towards the shaft, and being disposed adjacent to another side of the magnetic force generating means, a slide bush, disposed between the inner flange of the second magnetism transmission member and the shaft, the slide bush being secured to the inner flange so that a very small gap is present relative to an outside surface of the shaft;

a seal member for sliding relative to an outer peripheral surface of the shaft, the seal member being accommodated in the sealing groove in a state of at least partially protruding towards the shaft; and a magnetic fluid, held between the shaft and the magnetism transmission member by the magnetic force generated by the magnetic force generating means; wherein a fluid-holding protrusion projecting towards the shaft and the seal member is formed at an end portion, located in proximity to the shaft, of a first of a pair of inner flanges of the first magnetism transmission member, the first inner flange disposed in proximity to the magnetic force generating means.

According to the second aspect, the fluid-holding protrusion, projecting towards the shaft and the seal member, is formed on the first inner flange of the magnetism transmission member. As a result, the sliding surface of the seal member for sliding against the shaft is provided in a state of being in proximity with the fluid-holding protrusion at which the largest amount of the magnetic fluid is held. Therefore, the distance between the magnetic fluid held by the magnetism transmission member and the seal member is reduced, and the magnetic fluid can readily reach the sliding surface of the seal member. Specifically, in the seal device according to the present invention, the magnetic fluid is capable of functioning, to a sufficient degree, as a lubricant in a vicinity of the interface where the seal member and the shaft slide, and increasing the sliding lifespan of the seal member.

Also, providing a slide bush obviates the need for a bearing in the seal device, allows a reduction in the length of the seal device in an axial direction, and enables the seal device to be freely designed without a radial direction dimension being affected by bearing dimensions.

Also, having a member for securing the slide bush be the same as the magnetism transmission member forming a magnetic circuit makes it possible to utilize space in an effective manner and contribute towards reducing the length in the axial direction.

A seal device according to a third aspect of the present invention is a device for sealing a shaft for transmitting a predetermined mechanical motion to an interior of a treatment chamber maintained in a predetermined environment from an exterior of the treatment chamber while maintaining the environment in the treatment chamber, the seal device characterized in comprising:

a housing through which the shaft penetrates;

magnetic force generating means for generating a magnetic force in a vicinity of the shaft, the magnetic force generating means being disposed between the housing and the shaft;

a first magnetism transmission member for transmitting the magnetic force generated by the magnetic force generating means, the first magnetism transmission member being disposed adjacent to one side of the magnetic force generating means and having a pair of inner flanges projecting from said housing towards said shaft, the inner flanges forming a sealing groove surrounding said shaft;

a second magnetism transmission member for transmitting the magnetic force generated in the magnetic force generating means, the second magnetism transmission member having an inner flange protruding from the housing towards the shaft; and being disposed adjacent to another side of the magnetic force generating means;

a slide bush, disposed between the inner flange of the second magnetism transmission member and the shaft, the slide bush being secured to the inner flange so that a very small gap is present relative to an outer peripheral surface of the shaft;

a seal member for sliding relative to the outer peripheral surface of the shaft, the seal member being accommodated in the sealing groove in a state of least partially protruding towards the shaft; and a magnetic fluid, held between the shaft and the magnetism transmission member by the magnetic force generated by the magnetic force generating means; wherein the sealing groove has a dovetail groove shape.

According to the third aspect, the seal member is accommodated in the sealing groove having a dovetail groove shape. Therefore, the sliding surface of the seal member for sliding against the shaft is provided in a state of being in proximity with the fluid-holding protrusion at which a large amount of the magnetic fluid is held. Therefore, the distance between the magnetic fluid held by the magnetism transmission member and the seal member is reduced, and the magnetic fluid can readily reach the sliding surface of the seal member. Specifically, in the seal device according to the present invention, the magnetic fluid is capable of functioning, to a sufficient degree, as a lubricant in a vicinity of the interface where the seal member and the shaft slide, and increasing the sliding lifespan of the seal member.

Also, providing a slide bush obviates the need for a bearing in the seal device, allows a reduction in the length of the seal device in an axial direction, and enables the seal device to be freely designed without a dimension in a radial direction being affected by bearing dimensions.

Also, having a member for securing the slide bush to be the same as the magnetism transmission member forming a magnetic circuit makes it possible to utilize space in an effective manner and contribute towards reducing the length in the axial direction.

A seal device according to a fourth aspect of the present invention is the seal device according to any of first through third aspects, characterized in that a sleeve is fitted onto a portion on an outer peripheral surface of the shaft that faces first and second magnetic pole members.

The fourth aspect obviates the need for a shipping of a shaft to be included in a shipping of the seal device as required according to the prior invention. The seal device may be shipped without the shaft. During replacement of the seal device, the seal device may be replaced without a need for replacing the shaft. The seal device can be used for an existing shaft, and can be said to be a completely cartridge-type seal device.

Effect of the Invention

The present invention has the following excellent effects.

(1)

The seal member having protruding parts projecting towards each of the vertices of the rectangular shape is accommodated in the sealing groove having a substantially rectangular cross-section. As a result, two of the protruding parts that project towards the shaft and form a sliding surface for sliding against the shaft are provided in a state of being in proximity with a distal end part of a magnetism transmission member where a large amount of the magnetic fluid is secured. Therefore, the distance between the magnetic fluid held by the magnetism transmission member and the sliding surface of the seal member is reduced, and the magnetic fluid can readily reach the sliding surface of the seal member. Specifically, in the seal device according to the present invention, the magnetic fluid is capable of functioning, to a sufficient degree, as a lubricant in a vicinity of the interface where the seal member and the shaft slide, and increasing the sliding lifespan of the seal member.

Also, providing a slide bush obviates the need for a bearing in the seal device can be obviated, allows the length of the seal device in an axial direction to be reduced, and enables the seal device to be freely designed without a radial direction dimension being affected by bearing dimensions.

Also, having a member for securing the slide bush be the same as the magnetism transmission member forming a magnetic circuit makes it possible to utilize space in an effective manner and contribute towards reducing the length in the axial direction.

(2) The fluid-holding protrusion, projecting towards the shaft and the seal member, is formed on the first inner flange of the magnetism transmission member. As a result, the sliding surface of the seal member for sliding against the shaft is provided in a state of being in proximity with the fluid-holding protrusion at which the largest amount of the magnetic fluid is held. Therefore, the distance between the magnetic fluid held by the magnetism transmission member and the seal member is reduced, and the magnetic fluid can readily reach the sliding surface of the seal member. Specifically, in the seal device according to the present invention, the magnetic fluid is capable of functioning, to a sufficient degree, as a lubricant in a vicinity of the interface where the seal member and the shaft slide, and increasing the sliding lifespan of the seal member.

Also, providing a slide bush obviates the need for a bearing in the seal device can be obviated, allows the length of the seal device in an axial direction to be reduced, and enables the seal device to be freely designed without a radial direction dimension being affected by bearing dimensions.

Also, having a member for securing the slide bush be the same as the magnetism transmission member forming a magnetic circuit makes it possible to utilize space in an effective manner and contribute towards reducing the length in the axial direction.

(3) The seal member is accommodated in the sealing groove having a dovetail groove shape. Therefore, the sliding surface of the seal member for sliding against the shaft is provided in a state of being in proximity with the fluid-holding protrusion at which a large amount of the magnetic fluid is held. Therefore, the distance between the magnetic fluid held by the magnetism transmission member and the seal member is reduced, and the magnetic fluid can readily reach the sliding surface of the seal member. Specifically, in the seal device according to the present invention, the magnetic fluid is capable of functioning, to a sufficient degree, as a lubricant in a vicinity of the interface where the seal member and the shaft slide, and increasing the sliding lifespan of the seal member.

Also, providing a slide bush obviates the need for a bearing in the seal device can be obviated, allows the length of the seal device in an axial direction to be reduced, and enables the seal device to be freely designed without a radial direction dimension being affected by bearing dimensions.

Also, having a member for securing the slide bush be the same as the magnetism transmission member forming a magnetic circuit makes it possible to utilize space in an effective manner and contribute towards reducing the length in the axial direction.

(4) The sleeve is fitted onto a portion on an outer peripheral surface of the shaft that faces first and second magnetic pole members. This eliminates the need for the shaft to be included when the seal device is shipped, as required according to the prior invention. The seal device may be shipped without the shaft. During replacement of the seal device, the seal device may be replaced without a need for replacing the shaft. The seal device can be used for an existing shaft, and can be said to be a completely cartridge-type seal device.

CARRYING OUT THE INVENTION

Embodiments of a contaminant-sealing device according to the present invention will now be described in detail with reference to the drawings. However, the invention shall not be construed to be limited thereby; and may be changed, modified, or improved according to the knowledge of one skilled in the art provided that no departure is made from the scope of the present invention.

[First Embodiment]

Figure 1:
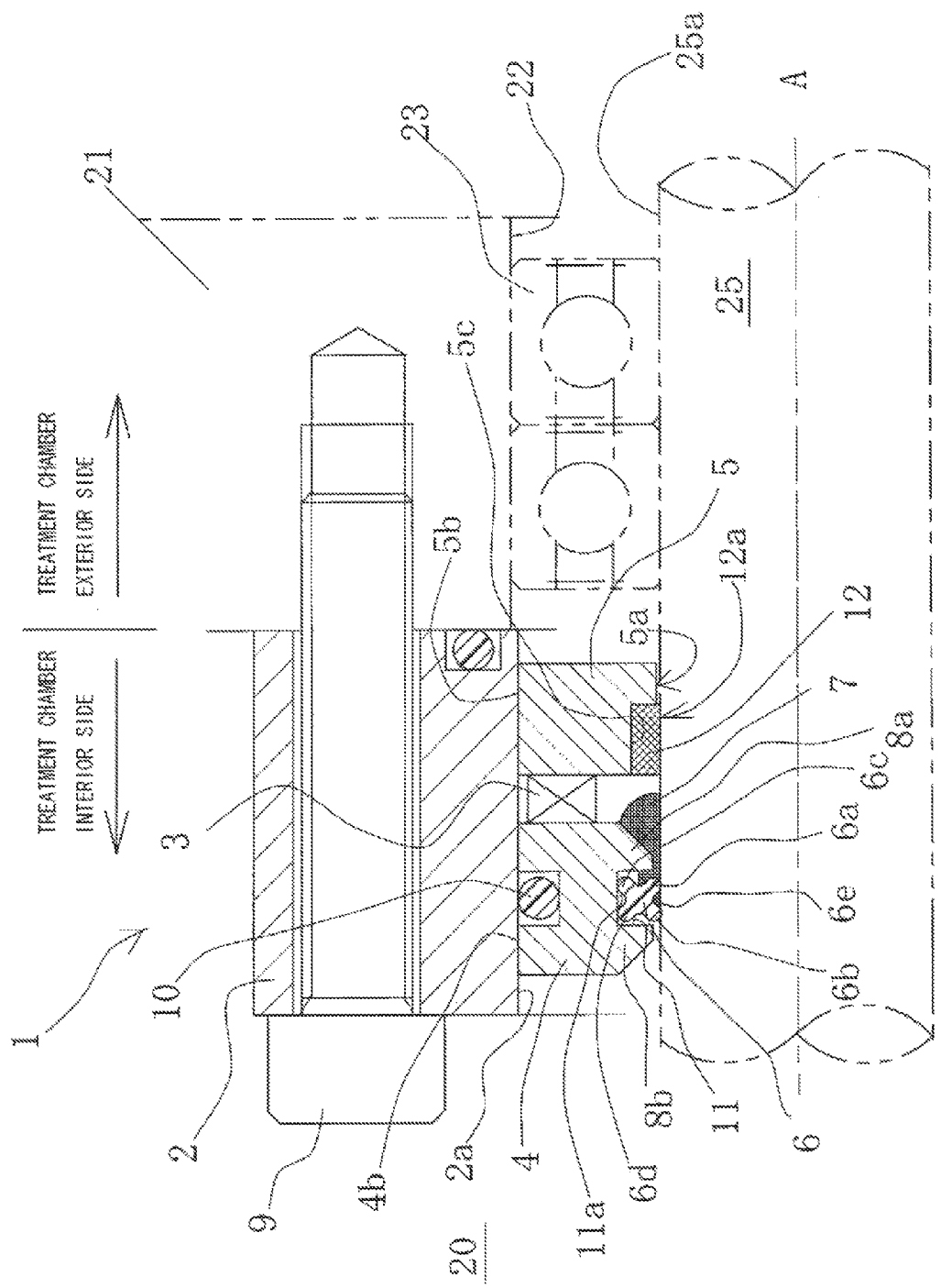
FIG. 1 is a front cross-section view of a seal device according to a first embodiment of the present invention.

FIG. 1 is a front cross-section view of a seal device according to a first embodiment of the present invention.

A seal device 1 is provided so as to block an opening 22 of a flange 21 provided to a treatment chamber 20, and is capable of keeping an interior of the treatment chamber 20 in a sealed state relative to an exterior of the treatment chamber. A bearing 23 for supporting a shaft 25 is provided to the opening 22.

There are no particular limitations as to the treatment chamber 20 to which the seal device 1 according to the present embodiment is provided; examples of include a wafer treatment chamber for treating a silicon wafer, or a load lock chamber that alternates between a vacuum state and an atmospheric pressure state. The treatment chamber may be one in which the interior is maintained in a negative pressure environment, or may be one that is maintained at an equal pressure or in a pressurized environment, relative to the exterior of the treatment chamber.

The seal device 1 has a housing 2 made of a non-magnetic material, a magnet 3 as magnetic force generating means, first and second magnetic pole members 4, 5 as magnetism transmission members, an X-ring 6 as a seal member, a magnetic fluid 7 as a lubricant, and a slide bush 12 as a centering member. The shaft 25 is disposed so as to penetrate the cylindrical housing 2. The magnet 3 and the first magnetic pole member 4 may be integrally formed. Alternatively, the magnet 3 may form part of the first magnetic pole member 4, and, for example, a portion of the first magnetic pole member 4 for securing the magnetic fluid 7 (i.e., a first inner flange 8a) may be the magnetic force generating means.

An end part of the shaft 25 towards the exterior of the treatment chamber is connected to a driving part (not shown). The shaft 25 according to the present embodiment can be driven by a driving force from the driving part so as to undergo a rotating motion about a center of rotation A. An end part of the shaft 25 towards the interior of the treatment chamber is connected to a driven part (not shown) provided to the interior of the treatment chamber 20. The shaft 25 according to the present embodiment is thereby capable of transmitting the rotating motion generated by the driving part provided to the exterior of the treatment chamber 20 to the interior of the treatment chamber 20. Although the shaft 25 is formed using a magnetic material, the shaft is not limited to one in which the entirety is made of a solid magnetic material. For example, the shaft may be one made of austenite steel or a non-ferrous material, quartz, or another non-magnetic material, a surface of which being fitted with a sleeve made of a magnetic material; or the shaft may comprise solely the sleeve. A resin coating or another treatment may also be applied, for purposes of sliding characteristics or rust resistance, to a surface of a shaft formed using a magnetic material. The coating may have a thickness at which magnetic field lines from the magnetic material is not significantly weakened.

The housing 2 is a cylindrical member, provided so as to allow the shaft 25 to penetrate, and is secured to the flange 21 of the treatment chamber 20 by a bolt 9 or other securing means. A predetermined gap is provided between an inner peripheral surface 2a of the housing 2 and an outer peripheral surface 25a of the shaft 25 so as to allow the magnet 3, the first magnetic pole member 4, the second magnetic pole member 5, the X-ring 6, and other components to be provided.

The second magnetic pole member 5, the magnet 3, and the first magnetic pole member 4 are provided, along the direction of the center of rotation A, between the inner peripheral surface 2a of the housing 2 and the outer peripheral surface 25a of the shaft 25. The magnet 3, which has an annular shape, is the magnetic force generating means for generating a magnetic force for holding the magnetic fluid 7 as described further below, and is provided in a state of being sandwiched by the first magnetic pole member 4 and the second magnetic pole member 5 on either side along the direction of the center of rotation A. The shape of the magnet 3 is not limited to an annular shape as in the present embodiment, and may be e.g., cylindrical magnets arranged in a ring surrounding the shaft 25 so that axes of the magnets are parallel.

The annular second magnetic pole member 5 is connected to a distal end of the magnet 3 towards the exterior of the treatment chamber. The second magnetic pole member 5 is a magnetic material provided so as to be in contact with the magnet 3. An inner peripheral flange 5a, which is an inner peripheral end part of the second magnetic pole member 5, is provided so that a very small gap is provided relative to the outer peripheral surface 25a of the shaft 25. An outer peripheral end part 5b of the second magnetic pole member 5 may be secured to the inner peripheral surface 2a of the housing 2.

An annular concave part 5c, into which the slide bush 12 is pressed, is provided along a part in a width direction of the inner peripheral flange 5a of the second magnetic pole member 5. The slide bush 12 is provided for purposes of centering, or preventing decentering of, the seal device; is made in an annular shape from PTFE or another resin material or a metallic material; and is pressed into or otherwise secured in the annular concave part 5c in the inner peripheral flange 5a of the second magnetic pole member 5. An inner peripheral surface 12a of the slide bush 12 is made so as to form a very small gap relative to the outer peripheral surface 25a of the shaft 25.

The slide bush 12 may be of such width and thickness of as to allow centering, or preventing decentering, of the seal device, and the width may merely be a fraction of the width of the bearing 55 used in the prior invention. Therefore, the length of the seal device 1 in the axial direction can be significantly reduced.

The annular first magnetic pole member 4 is connected to a distal end of the magnet 3 towards the interior of the treatment chamber. As with the second magnetic pole member 5, the first magnetic pole member 4 is a magnetic material provided so as to be in contact with the magnet 3. An outer peripheral end part 4b of the first magnetic pole member 4 is secured in place to the inner peripheral surface 2a of the housing 2. A static seal member 10, for sealing between the outer peripheral end part 4b of the first magnetic pole member 4 and the inner peripheral surface 2a of the housing 2, may be provided between the first magnetic pole member 4 and the housing 2.

The first magnetic pole member 4 has a first inner flange 8a and a second inner flange 8b, each of which projecting from a side nearer the inner peripheral surface 2a of the housing 2 towards the outer peripheral surface 25a of the shaft 25. The first inner flange 8a and the second inner flange 8b are shaped so as to be symmetrical to each other, and a sealing groove 11 opening towards the shaft 25 is formed between the first inner flange 8a and the second inner flange 8b. The sealing groove 11, observed from a cross-section passing through the center of rotation A of the shaft 25, has a substantially rectangular cross-section.

The X-ring 6 has a first protrusion 6a, a second protrusion 6b, a third protrusion 6c, and a fourth protrusion 6d projecting towards each of the vertices of the rectangular cross-section of the sealing groove 11.

The first protrusion 6a and the second protrusion 6b project towards those vertices of the rectangle that are located towards the opening of the sealing groove 11. The first protrusion 6a projects towards a vertex towards the opening of the sealing groove 11 nearer the first inner flange 8a, and the second inner flange 8b projects towards a vertex nearer the second inner flange 8b.

The third protrusion 6c and the fourth protrusion 6d project towards vertices of the rectangle that are located towards a bottom part 11a of the sealing groove 11. The first through fourth protrusions of the X-ring 6 are formed in continuation along a circumferential direction of the X-ring 6.

The third protrusion 6c and the fourth protrusion 6d are in contact with the bottom part 11a of the sealing groove 11, and the X-ring 6 is in intimate contact with the sealing groove 11 in continuation along the circumferential direction. The X-ring 6 is designed so as to have an inner diameter that substantially matches, or is slightly smaller than, a diameter of the shaft 25. Therefore, when the shaft 25 rotates about the center of rotation A, the first protrusion 6a and the second protrusion 6b of the X-ring 6 slides against the outer peripheral surface 25a of the shaft 25. The X-ring 6 according to the first embodiment can thereby provide a seal between the first magnetic pole member 4 and the shaft 25.

A fluid-holding groove 6e for allowing the magnetic fluid 7 to reach the second protrusion 6b is formed between the first protrusion 6a and the second protrusion 6b. Specifically, the fluid-holding groove 6e is designed so that a surface tension between the fluid-holding groove 6e and the outer peripheral surface 25a of the shaft 25 facing the fluid-holding groove 6e is capable of guiding the magnetic fluid 7 from the first protrusion 6a to the second protrusion 6b. The fluid-holding groove 6e can hold the magnetic fluid 7 between the fluid-holding groove 6e and the outer peripheral surface 25a of the shaft 25 facing the fluid-holding groove 6e. The magnetic fluid 7 used in the present embodiment comprises magnetic ultrafine particles, each of which being about 5 to 50 nm in diameter, dispersed using a surfactant into a solvent or an oil (i.e., a base oil); and has a characteristic of moving along magnetic field lines and being trapped by a magnetic field. In the seal device 1 according to the present embodiment, the magnetic fluid 7 is used as a lubricant acting on a sliding surface between the shaft 25 and the X-ring 6, and extends the sliding lifespan of the X-ring 6. Also, the magnetic fluid 7 is capable of providing adequate sealing performance at the sliding surface between the X-ring 6 and the shaft 25, and of minimizing dust generation near the sliding surface.

When the shaft 25 rotates about the center of rotation A, a vicinity of a distal end part of the first inner flange 8a holds the largest amount of the magnetic fluid 7. Since the first protrusion 6a of the X-ring 6 is provided so as to be in proximity with the distal end part of the first inner flange 8a, the magnetic fluid 7 can readily reach an interface where the shaft 25 and the first protrusion 6a of the X-ring 6 side, and function as a lubricant to a sufficient degree.

Since the fluid-holding groove 6e is formed on the X-ring 6, the magnetic fluid 7 can readily reach the second protrusion 6b via the first protrusion 6a and the fluid-holding groove 6e. Specifically, in the seal device 1 according to the first embodiment, the magnetic fluid 7 can readily reach each of the respective sliding surfaces formed between the outer peripheral surface 25a of the shaft 25 and each of the first protrusion 6a and the second protrusion 6b. Therefore, the magnetic fluid 7 is capable of functioning as a lubricant in the interface where the X-ring 6 and the shaft 25 slide.

The magnetic fluid 7 may also be held at a distal end part of the second inner flange 8b. The magnetic fluid 7 held in a vicinity of the distal end part of the second inner flange 8b is capable of readily reaching the second protrusion 6b of the X-ring 6. However, since the distance from the second inner flange 8b to the magnet 3 is longer than that from the first inner flange 8a, less magnetic flux passes through the second inner flange 8b than the first inner flange 8a. Therefore, the amount of the magnetic fluid 7 held at the distal end part of the second inner flange 8b is small, and the magnetic fluid 7 held at the distal end part of the second inner flange 8b may not be sufficient for lubricating the sliding surface between the second protrusion 6b and the outer peripheral surface 25a of the shaft 25.

However, in the seal device 1 according to the first embodiment, the magnetic fluid 7 held in the vicinity of the distal end part of the first inner flange 8a is capable of readily reaching the second protrusion 6b via the first protrusion 6a and the fluid-holding groove 6e, as described above. Therefore, the magnetic fluid 7 is capable of functioning, to a sufficient degree, as a lubricant in the interface where the X-ring 6 and the shaft 25 slide.

[Second Embodiment]

Figure 2:
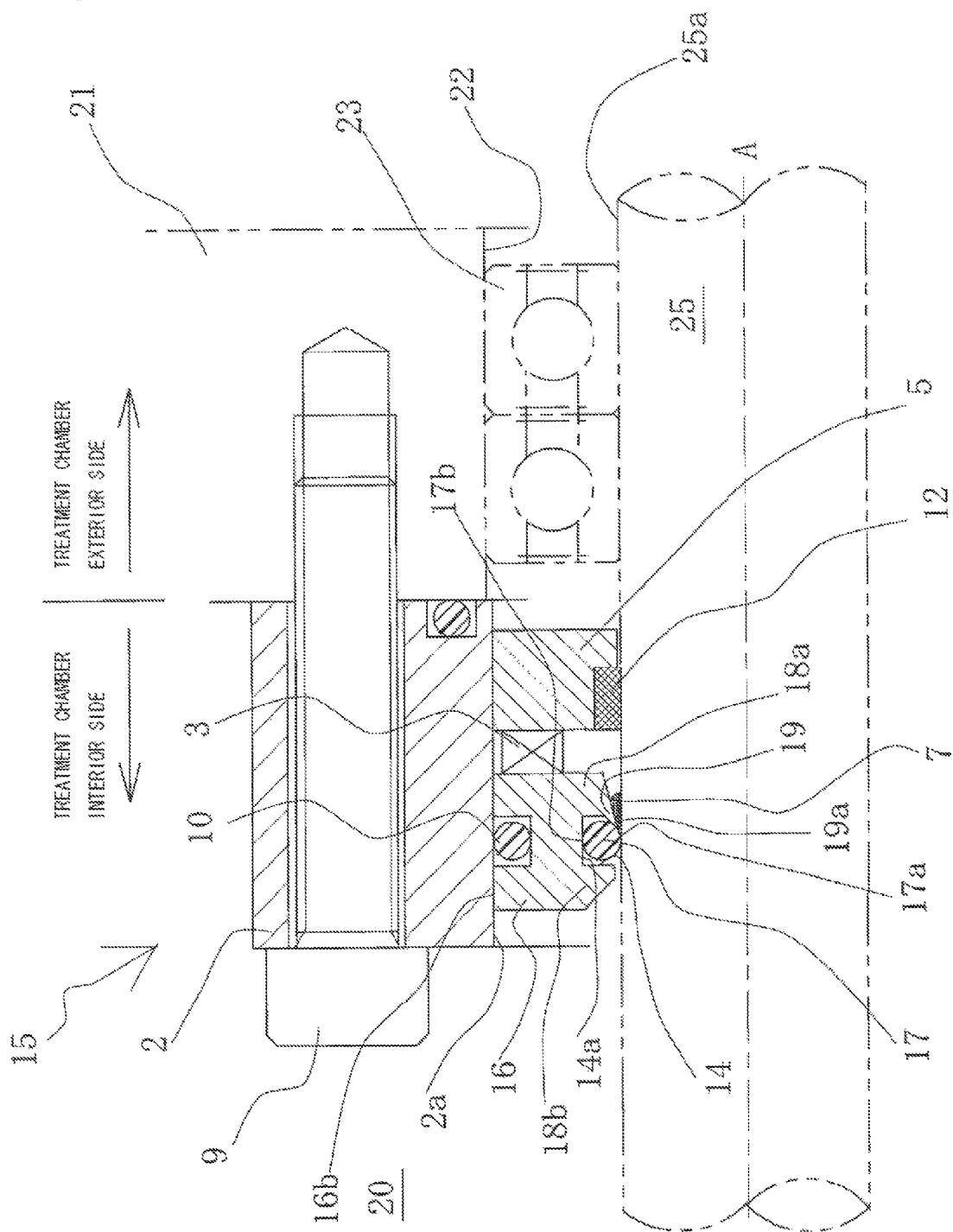
FIG. 2 is a front cross-section view of a seal device according to a second embodiment of the present invention.

FIG. 2 is a front cross-section view of a seal device 15 according to a second embodiment of the present invention.

In the seal device 15 according to the second embodiment, the shape of a first magnetic pole member 16 and the shape of an O-ring 17 used as a seal member are different from the shape of the first magnetic pole member 4 and the first magnetic pole member 16 provided to the seal device 1 according to the first embodiment, respectively. However, other portions are identical to those used in the seal device 1 according to the first embodiment, and members that are identical to those used in the first embodiment are affixed with the same numerals as those in the first embodiment.

The first magnetic pole member 16 has a first inner flange 18a and a second inner flange 18b, each projecting from a side nearer the inner peripheral surface 2a of the housing 2 towards the outer peripheral surface 25a of the shaft 25. The first inner flange 18a is formed further towards the exterior of the treatment chamber 20 relative to the second inner flange 18b. Therefore, the first inner flange 18a is provided nearer the magnet 3 relative to the second inner flange 18b.

A distal end part of the first inner flange 18a on a side that is closer to the shaft 25 is provided with a fluid-holding protrusion 19, formed so as to project towards the shaft 25 and the O-ring 17. The fluid-holding protrusion 19 is provided so as to form a very small gap relative to the outer peripheral surface 25a of the shaft 25. The magnetic fluid 7 is held in a vicinity of a distal end part 19a of the fluid-holding protrusion 19 by a magnetic force generated by the magnet 3.

A sealing groove 14 is formed between the first inner flange 18a and the second inner flange 18b. The sealing groove 14 is formed so as to surround the shaft 25, and has an opening towards the outer peripheral surface 25a of the shaft 25.

The annular O-ring 17 is accommodated in the sealing groove 14. The O-ring 17 according to the present embodiment, when observed from a cross-section passing through the center of rotation A of the shaft 25, has a substantially circular or a substantially elliptical cross-section. A part of the O-ring 17 is accommodated so as to protrude from the opening of the sealing groove 14.

An end part 17b on an outer periphery of the O-ring 17 is in contact with a bottom part 14a of the sealing groove 14, and the end part 17b on the outer periphery of the O-ring 17 is in intimate contact with the bottom part 14a of the sealing groove 14 in continuation along a circumferential direction.

The O-ring 17 is in slight contact with the shaft 25, and is designed so as not to avoid generating an excessively large contact torque but to exhibit a sufficient sealing ability. In the seal device 15 according to the present embodiment, the O-ring 17 is accommodated in the sealing groove 14 in a state of being slightly flattened in a radial direction relative to the center of rotation A by the bottom part 14a of the sealing groove 14 and the outer peripheral surface 25a of the shaft 25. The O-ring 17 is preferably made from an elastomer or another material having adequate elasticity.

When the shaft 25 rotates about the center of rotation A, an end part 17a on an inner periphery of the O-ring 17 slides against the outer peripheral surface 25a of the shaft 25. Therefore, the O-ring 17 according to the present embodiment is capable of providing a seal between the first magnetic pole member 16 and the shaft 25.

The magnetic fluid 7 is held in a vicinity of the distal end part 19a of the fluid-holding protrusion 19. The magnetic fluid 7 used in the present embodiment comprises magnetic ultrafine particles, each of which being about 5 to 50 nm in diameter, dispersed using a surfactant into a solvent or an oil (i.e., a base oil); and has a characteristic of moving along magnetic field lines and being trapped by a magnetic field. In the seal device 15 according to the present embodiment, the magnetic fluid 7 is used as a lubricant acting on a sliding surface between the shaft 25 and the O-ring 17, and extends the sliding lifespan of the O-ring 17. Also, the magnetic fluid 7 is capable of providing adequate sealing performance at the sliding surface between the O-ring 17 and the shaft 25, and of minimizing dust generation near the sliding surface.

When the shaft 25 rotates about the center of rotation A, the magnetic fluid 7 held in a vicinity of the distal end part 19a of the fluid-holding protrusion 19 reaches a sliding surface between the shaft 25 and the O-ring 17, and acts as a lubricant. In the seal device 15 according to the present embodiment in particular, the fluid-holding protrusion projects towards the O-ring 17 and the shaft 25, and the distal end part 19a of the fluid-holding protrusion 19 at which the largest amount of the magnetic fluid 7 is held is therefore positioned in proximity with the O-ring 17. Therefore, the magnetic fluid 7 is capable of readily reaching the sliding surface between the shaft 25 and the O-ring 17 via the O-ring 17.

As shown in FIG. 2, since the O-ring 17 has a substantially circular or a substantially elliptical cross-section, the ring inner peripheral end part 17a, which is a sliding surface of the O-ring 17, is positioned in proximity with the distal end part 19a of the fluid-holding protrusion 19. Therefore, the magnetic fluid 7 held around the distal end part 19a of the fluid-holding protrusion 19 is further capable of readily reach the interface where the shaft 25 and the O-ring 17 slide, and is capable of functioning as a lubricant to a sufficient degree.

Of the two inner flanges 18a, 18b, the fluid-holding protrusion 19 is preferably formed on the first inner flange 18a that is in proximity to the magnet 3. More magnetic flux passes through the first inner flange 18a that is in proximity to the magnet 3 than through the second inner flange 18b. Therefore, forming the fluid-holding protrusion 19 on the first inner flange 18a makes it possible for the fluid-holding protrusion 19 to hold more magnetic fluid 7.

[Third Embodiment]

Figure 3:
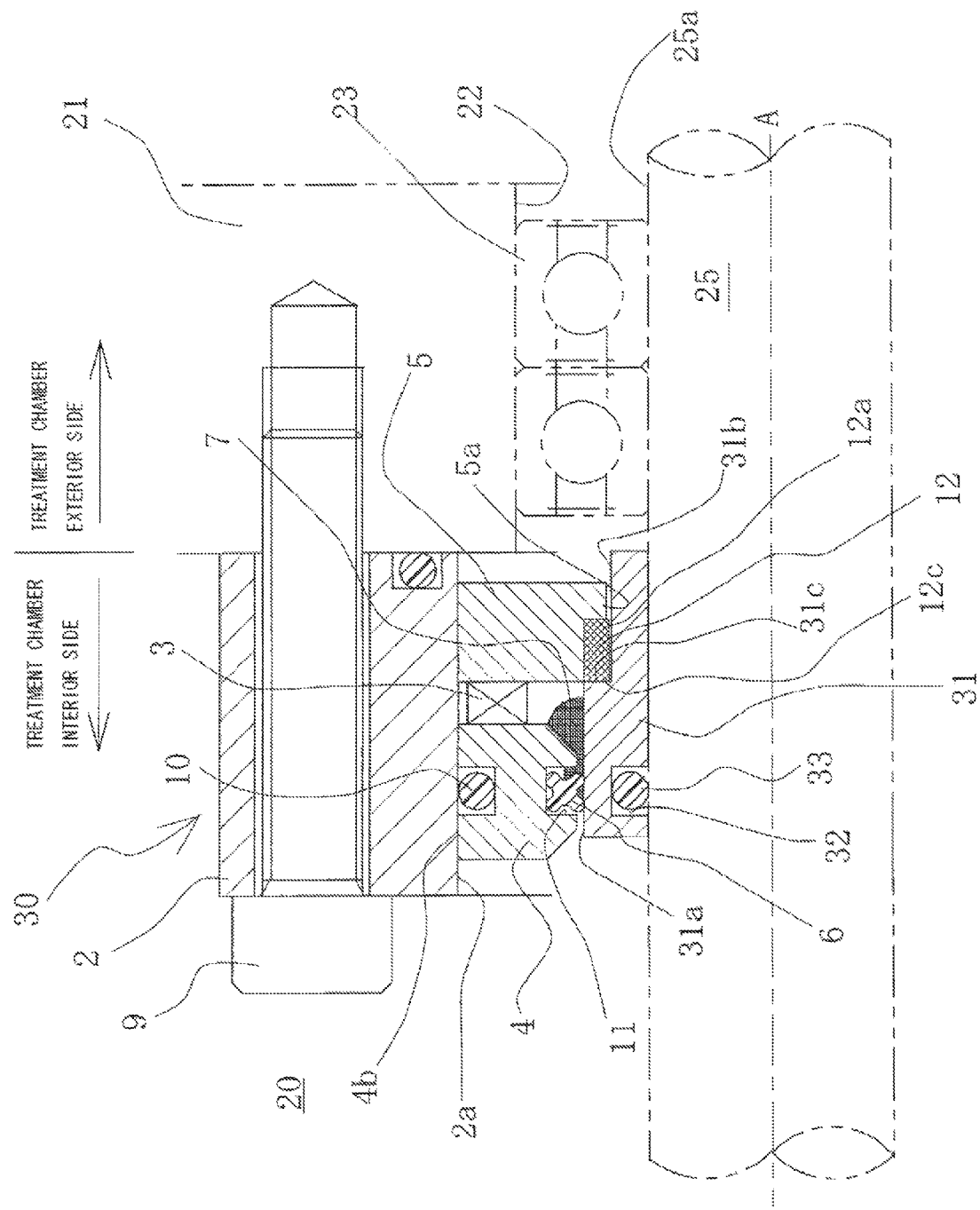
FIG. 3 is a front cross-section view of a seal device according to a third embodiment of the present invention.

FIG. 3 is a front cross-section view of a seal device 30 according to a third embodiment of the present invention.

The seal device 30 according to the third embodiment is different from the seal device 1 according to the first embodiment in having a sleeve 31 fitted on a portion of the outer peripheral surface of the shaft 25 facing the first and second magnetic pole members 4, 5. However, other portions are substantially identical to those used in the seal device 1 according to the first embodiment, and members that are identical to those used in the first embodiment are affixed with the same numerals as those in the first embodiment.

The sleeve 31 is to be fitted onto the portion of the outer peripheral surface of the shaft 25 facing the first and second magnetic pole members 4, 5, the sleeve having an annular shape, and being formed from a magnetic material.

An annular O-ring groove 32 that opens towards the outer peripheral surface 25a is provided to an inner peripheral surface side of the sleeve 31. An annular O-ring 33 is mounted in the O-ring groove 32 and seals between the inner peripheral surface of the sleeve 31 and the outer peripheral surface 25a of the shaft.

As shown in FIG. 3, the sleeve 31 has a substantially rectangular cross-section, and is formed so that a portion 31a facing the first magnetic pole member 4 has a diameter that is larger than that of a portion 31b facing the second magnetic pole member 5, forming a step section 31c. The sleeve 31 is provided so that a very small gap is present between the step section 31c and an outside surface 12c of a slide bush 12 provided to the inner peripheral flange 5a of the second magnetic pole member 5. Since the slide bush 12 is constructed so as to be sandwiched between the first magnetic pole member 4 and the sleeve 31 as described above, axial-direction positioning of the sleeve 31 can be readily achieved. Meanwhile, the slide bush 12 is formed so that the inner peripheral surface 12a faces the small-diameter portion 31b of the sleeve 31 with a very small gap present therebetween. Therefore, the second magnetic pole member 5 is shaped so that an inner peripheral surface 5a projects further inwards by a distance corresponding to the step section 31c compared to that according the first embodiment.

In the seal device 30 according to the present embodiment, providing the sleeve 31 obviates the need for a shaft 25 to be included when shipping the seal device as required according to the prior invention. The seal device 30 may be shipped without the shaft. During replacement of the seal device, the seal device 30 may be replaced without a need for replacing the shaft. The seal device 30 can be used for an existing shaft, and can be said to be a completely cartridge-type seal device.

[Fourth Embodiment]

Figure 4:
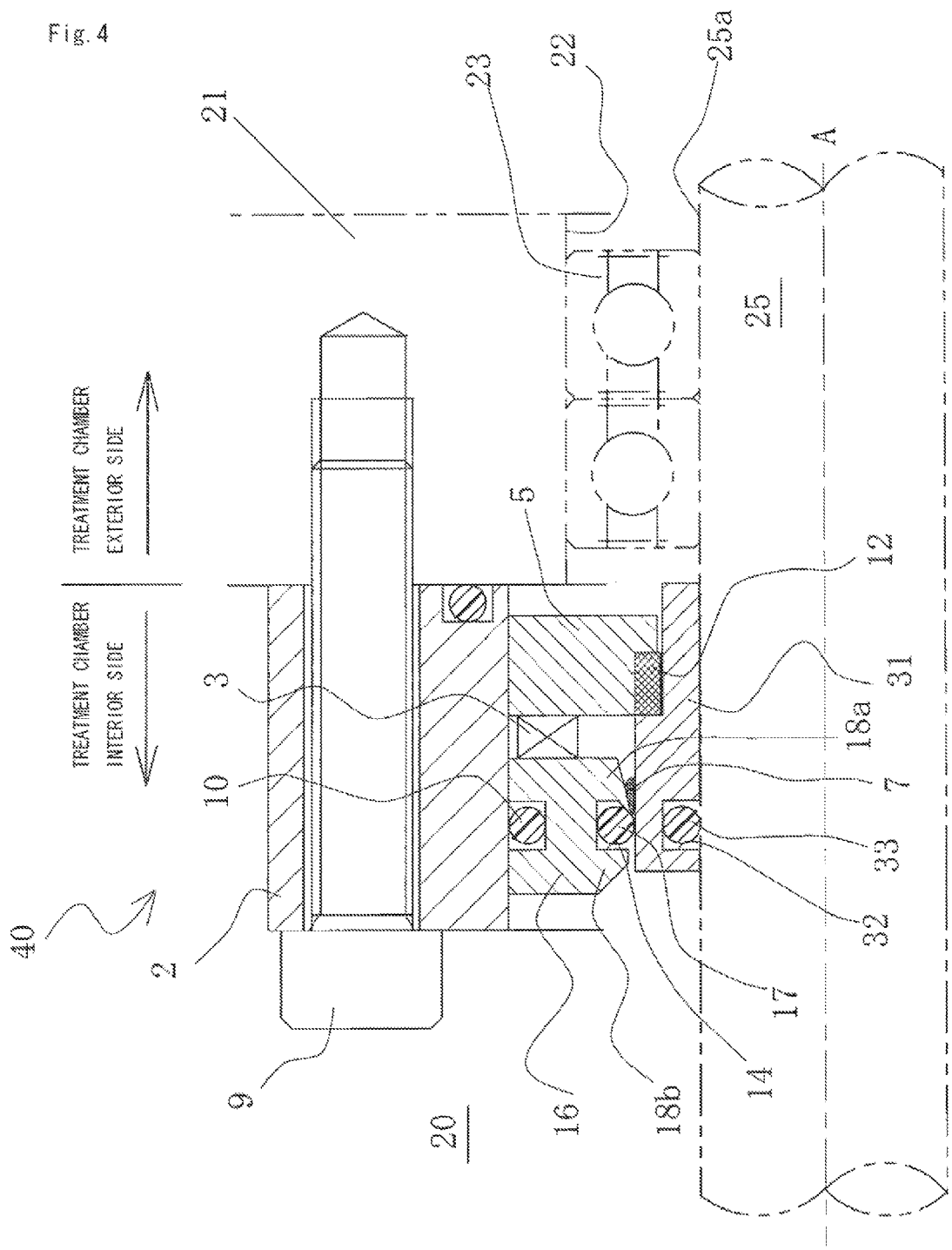
FIG. 4 is a front cross-section view of a seal device according to a fourth embodiment of the present invention.

FIG. 4 is a front cross-section view of a seal device 40 according to a fourth embodiment of the present invention.

The seal device 40 according to the third embodiment is different from the seal device 15 according to the second embodiment in having a sleeve 31 fitted on a portion of the outer peripheral surface of the shaft 25 facing the first and second magnetic pole members 16, 5. However, other portions are substantially identical to those used in the seal device 15 according to the second embodiment, and members that are identical to those used in the second embodiment are affixed with the same numerals as those in the second embodiment. The sleeve 31 and the O-ring 33 are identical to those in the third embodiment, and descriptions thereof shall be omitted.

An example of a method for securing the sleeve 31 used in the third and fourth embodiments to the shaft 25 is to use a bolt or other fastening means to fasten a positioning collar, semicircular in shape and divided into two parts (not shown), to one end of the sleeve 31 in the axial direction, thereby making it possible to secure the sleeve 31 to the shaft 25. It shall also be apparent that another known method can be used for mounting the sleeve 31.

Figure 5:
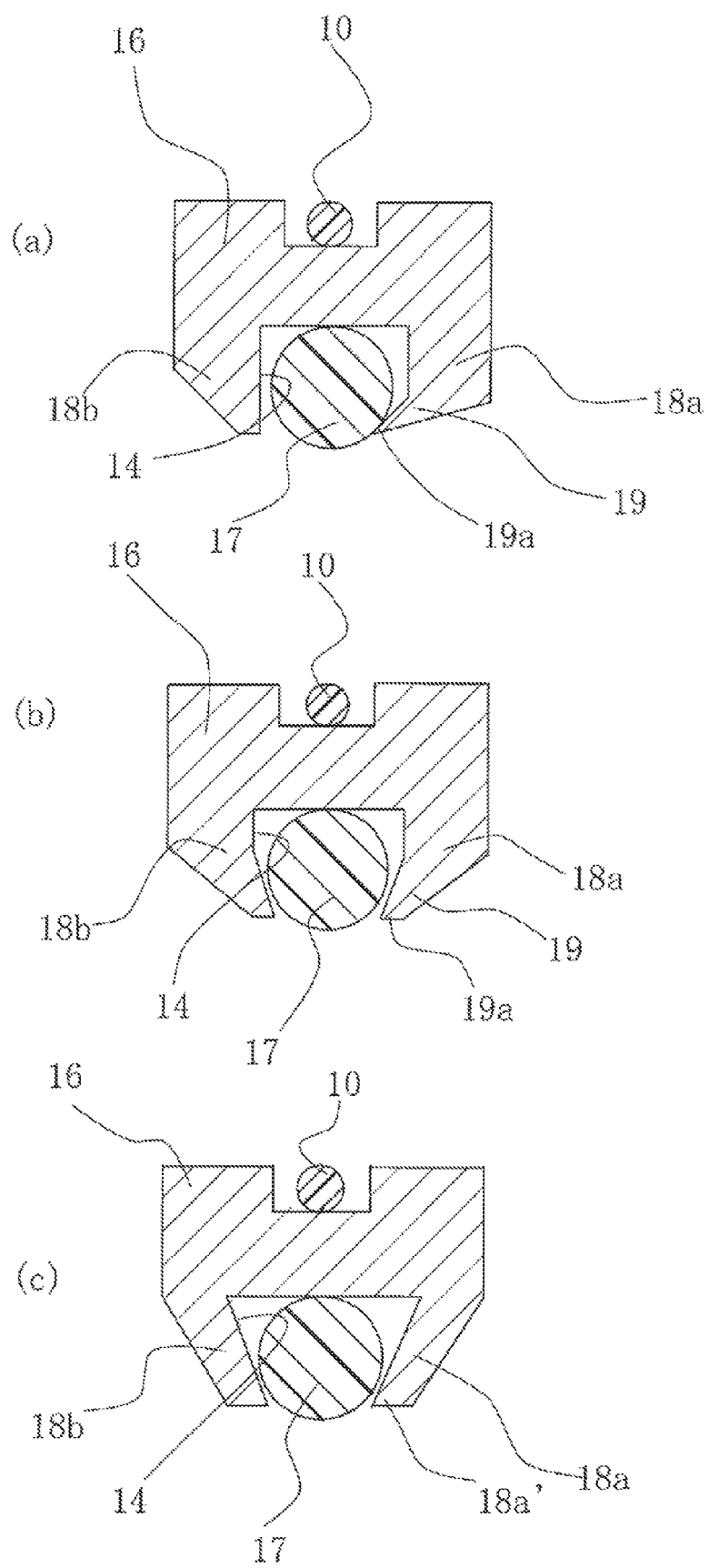
FIG. 5 is an expanded cross-section view showing a first magnetic pole member provided to a seal device according to an embodiment of the present invention, and an example of a modification thereof.
Figure 6:
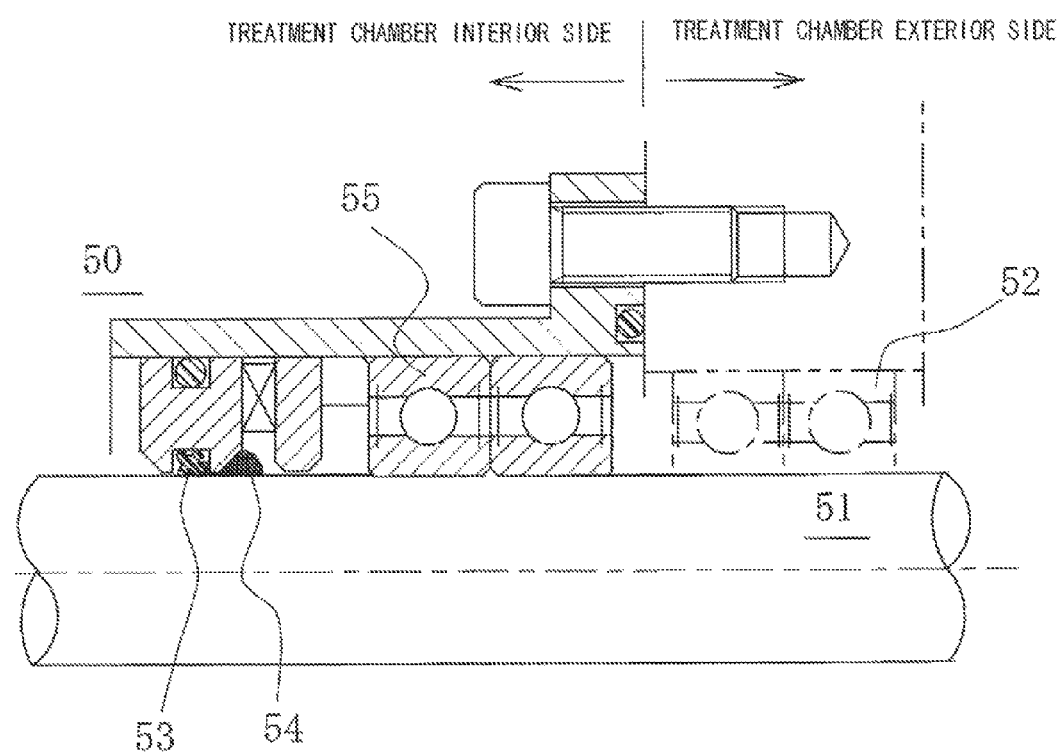
FIG. 6 is a front cross-section view used to describe an invention filed prior to the present invention.

The sealing groove 14 formed on the first magnetic pole member 16 used in the second embodiment and the fourth embodiment has a dovetail groove shape, as shown in FIG. 5(*a*). The first inner flange 18*a* forms a part of a wall of the sealing groove 14. The fluid-holding protrusion 19 formed at a distal end part of the first inner flange 18*a* is inclined towards the sealing groove 14. Also, in the seal device 15 and 40 according to the second and fourth embodiments, an O-ring 17, having a substantially circular or a substantially elliptical cross-section when observed from a cross-section passing through the center of rotation A of the shaft 25, is accommodated in the sealing groove 14 having a dovetail groove shape. Therefore, the distal end part 19*a* of the fluid-holding protrusion 19 at which the magnetic fluid 7 is held is in proximity with the O-ring 17, the magnetic fluid 7 can readily reach an interface where the shaft 25 and the first protrusion 6*a* of the X-ring 6 slide, and function as a lubricant to a sufficient degree.

The sealing groove 14 formed by the first inner flange 18*a* and the second inner flange 18*b* is not limited to having the shape shown in FIG. 5(*a*), and may, for example, have the shape shown in FIG. 5(*b*) or 5(*c*). Each of FIGS. 5(*b*) and 5(*c*) show a modification of the first magnetic pole member 16 shown in FIG. 5(*a*).

The first magnetic pole member 16 shown in FIG. 5(*b*) is shaped so that the first inner flange 18*a* is substantially symmetrical to the second inner flange 18*b*. In the modification shown in FIG. 5(*b*), the fluid-holding protrusion 19 is again formed at a distal end part of the first inner flange 18*a*, and a distal end part 19*a* of the fluid-holding protrusion 19 is positioned so as to be in proximity with the O-ring 17. Also, since the magnetic fluid 7 is held at the fluid-holding protrusion 19, the magnetic fluid 7 is positioned in proximity with the O-ring 17. Therefore, in an instance in which the first magnetic pole member 16 shown in FIG. 5(*b*) is used in the seal device 15 and 40 according to the second and the fourth embodiments, the magnetic fluid 7 is again capable of readily reaching the interface where the shaft 25 and the O-ring 17 slide, and capable of functioning as a lubricant to a sufficient degree.

The first magnetic pole member 16 shown in FIG. 5(*c*) is shaped so that the first inner flange 18*a* is substantially symmetrical to the second inner flange 18*b* and projects towards the sealing groove 14. In the modification shown in FIG. 5(*c*), the magnetic fluid 7 is held at a distal end part 18*a*' of the first inner flange 18*a*. In the modification shown in FIG. 5(*c*), the first inner flange 18*a* forming the sealing groove 14 project towards the sealing groove 14, and the sealing groove 14 has a dovetail groove shape. Therefore, the distal end part 18*a*' of the first inner flange 18*a* is positioned in proximity with the O-ring 17. Also, since the magnetic fluid 7 is held at the distal end part 18*a*' of the first inner flange 18*a*, the magnetic fluid 7 is also positioned in proximity with the O-ring 17. Therefore, in an instance in which the first magnetic pole member 16 shown in FIG. 5(*c*) is used in the seal device 15 and 40 according to the second and fourth embodiments, the magnetic fluid 7 is again capable of readily reaching the interface where the shaft 25 and the O-ring 17 slide, and is capable of functioning as a lubricant to a sufficient degree.

The invention claimed is:

1. A device for sealing a shaft for transmitting a predetermined mechanical motion to an interior of a treatment chamber maintained in a predetermined environment from an exterior of the treatment chamber while maintaining the environment in the treatment chamber, the seal device characterized in comprising:
    a housing through which said shaft penetrates;
    magnetic force generator for generating a magnetic force in a vicinity of said shaft, the magnetic force generator being disposed between said housing and said shaft;
    a first magnetism transmission member for transmitting the magnetic force generated by the magnetic force generator, the first magnetism transmission member being disposed adjacent to one side of the magnetic force generator and having a pair of inner flanges projecting from said housing towards said shaft, the inner flanges forming a sealing groove surrounding said shaft;
    a second magnetism transmission member for transmitting the magnetic force generated by the magnetic force generator, the second magnetism transmission member having an inner flange protruding from said housing towards said shaft, and being disposed adjacent to another side of the magnetic force generator;
    a slide bush, disposed between the inner flange of said second magnetism transmission member and the shaft, the slide bush being secured to said inner flange so that a very small gap is present relative to an outside surface of said shaft;
    a seal member for sliding relative to an outer peripheral surface of said shaft, the seal member being accommodated in said sealing groove in a state of at least partially protruding towards said shaft; and
    a magnetic fluid, held between said shaft and said magnetism transmission member by the magnetic force generated by said magnetic force generator; wherein
    said sealing groove has a substantially rectangular cross-section passing through a center axis of said shaft;
    said seal member has four protruding parts projecting towards respective vertices of said substantially rectangular shape of said sealing groove; and
    two of said protruding parts that project towards said shaft have formed therebetween a fluid-holding groove for holding said magnetic fluid.

2. The seal device according to claim 1, characterized in that a sleeve is fitted onto a portion on the outer peripheral surface of the shaft that faces said first and second magnetism transmission members.

* * * * *